(12) United States Patent
Deffenbaugh et al.

(10) Patent No.: US 11,828,175 B2
(45) Date of Patent: Nov. 28, 2023

(54) SYSTEMS AND METHODS FOR MEASURING PHASE FLOW RATES OF A MULTIPHASE PRODUCTION FLUID

(71) Applicant: Saudi Arabian Oil Company, Dhahran (SA)

(72) Inventors: Max Deffenbaugh, Katy, TX (US); Robert Adams, Houston, TX (US); Thomas Joseph Theodore Hillman, Missouri City, TX (US)

(73) Assignee: Saudi Arabian Oil Company, Dhahran (SA)

( * ) Notice: Subject to any disclaimer, the term of this patent is extended or adjusted under 35 U.S.C. 154(b) by 383 days.

(21) Appl. No.: 17/370,243

(22) Filed: Jul. 8, 2021

(65) Prior Publication Data

US 2023/0008196 A1  Jan. 12, 2023

(51) Int. Cl.
  *E21B 49/08* (2006.01)
  *E21B 47/06* (2012.01)
  (Continued)

(52) U.S. Cl.
  CPC .......... *E21B 49/0875* (2020.05); *E21B 43/12* (2013.01); *E21B 47/06* (2013.01); *G01F 3/02* (2013.01)

(58) Field of Classification Search
  CPC ...... E21B 49/0875; E21B 43/12; E21B 47/06; G01F 3/02
  See application file for complete search history.

(56) References Cited

U.S. PATENT DOCUMENTS

| 3,638,498 A | 2/1972 | Nelms |
| 3,721,121 A | 3/1973 | Fierfort |
| (Continued) | | |

FOREIGN PATENT DOCUMENTS

| CA | 2204108 A1 | 4/1997 |
| CN | 104101658 A | 10/2014 |
| (Continued) | | |

*Primary Examiner* — Kristina M Deherrera
*Assistant Examiner* — Jean F Morello
(74) *Attorney, Agent, or Firm* — DINSMORE & SHOHL LLP

(57) ABSTRACT

Systems and methods for measuring phase flow rates of a multiphase production fluid are provided where a fluidic isolation chamber expands volumetrically in response to fluid pressure from a diverted multiphase production fluid. A pressure-regulating actuator regulates fluid pressure upstream of the fluidic isolation chamber and an upstream fluidic pressure sensor generates an upstream fluidic pressure signal. A fluidic control and analysis unit is configured to communicate with the upstream pressure sensor and the isolation chamber actuator to maintain fluidic pressure upstream of the fluidic isolation chamber as the multiphase production fluid is diverted to the fluidic isolation chamber. The unit generates a total flow rate $Q_{TOT}$ as a function of chamber filling time and volumetric expansion and communicates with the fluidic phase detector to generate a relative occupancy indicator I for a target phase of the multiphase production fluid in the fluidic isolation chamber. A flow rate $Q_P$ for the target phase is generated as a function of the total flow rate $Q_{TOT}$ and the relative occupancy indicator I.

27 Claims, 5 Drawing Sheets

(51) Int. Cl.
*E21B 43/12* (2006.01)
*G01F 3/02* (2006.01)

(56) References Cited

U.S. PATENT DOCUMENTS

| | | |
|---|---|---|
| 4,236,406 A | 12/1980 | Reed et al. |
| 5,239,862 A | 8/1993 | Atkinson |
| 5,251,488 A | 10/1993 | Haberman et al. |
| 7,034,937 B2 | 4/2006 | Crudge et al. |
| 8,227,260 B2 | 7/2012 | Yguerabide et al. |
| 8,333,573 B2 | 12/2012 | Tunna et al. |
| 9,291,585 B2 | 3/2016 | Singh et al. |
| 9,476,755 B2 | 10/2016 | Hurmuzlu et al. |
| 9,671,793 B2 * | 6/2017 | Atherton ............... G01F 1/74 |
| 10,228,325 B2 | 3/2019 | Zuo et al. |
| 10,240,590 B2 | 3/2019 | Levine |
| 10,634,537 B2 | 4/2020 | Toma et al. |
| 2011/0185795 A1 | 8/2011 | Colquhoun |
| 2018/0128789 A1 | 5/2018 | Hollnagel et al. |
| 2018/0217101 A1 * | 8/2018 | Hopper ............... G01N 29/326 |
| 2021/0096010 A1 * | 4/2021 | Rincon ............... G01F 1/74 |

FOREIGN PATENT DOCUMENTS

| | | |
|---|---|---|
| CN | 104101669 A | 10/2014 |
| EP | 1918705 B1 | 12/2009 |

\* cited by examiner

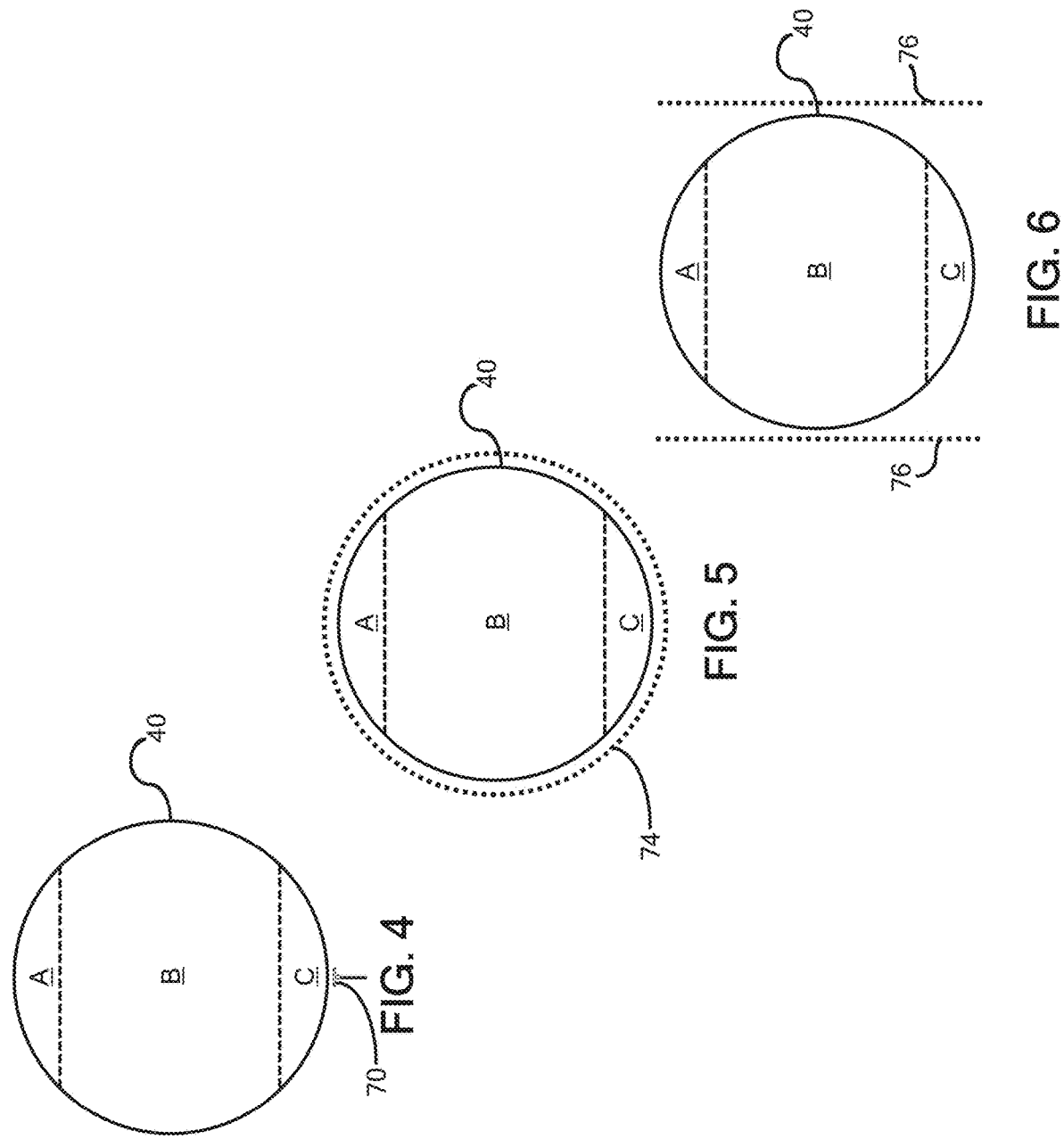

SYSTEMS AND METHODS FOR MEASURING PHASE FLOW RATES OF A MULTIPHASE PRODUCTION FLUID

FIELD OF THE INVENTION

The present disclosure relates to the analysis of multiphase production fluids and other types of multiphase fluid flow. More particularly, the present disclosure relates to the analysis of multiphase fluid flow in the oil and gas industries, where multiphase flow often involves the simultaneous flow of oil, water and gas.

BACKGROUND

Multiphase flow occurs throughout oil and gas production, where a mixture of oil, brine, and gas is typically found. The present inventors have recognized the importance of measuring the relative amounts of each fluid in the multiphase flow, as changes in these amounts can indicate the need to change production parameters to optimize recovery. It is difficult to measure the amounts of oil, brine, and gas in a multiphase flow. For example, it is often difficult to ensure that particular measurement techniques are uniformly sensitive to fluids at a wide variety of locations in a cross-section of a pipe because the measurement technique might only be calibrated for one flow regime or pattern in the structure of the flow. This can make it difficult to ensure the measurement accuracy where the geometry of the flow is different because the flow regime can change.

Multiphase flow meters measure phase fraction and flow rates of constituent phases in a multiphase fluid flow in order to optimize hydrocarbon or water production from wells and/or efficiently allocate production from a field containing multiple hydrocarbon or water producing wells.

Some multiphase metering systems measure the volume fraction of constituent phases in the fluid flow using gamma densitometry. Two or more discrete energies of gamma radiation pass through a fluid flow and impinge upon a detector element. The amplitude of the two or more discrete energies of gamma radiation are uniquely absorbed by the constituent phases in the multiphase fluid flow. The total decrease in amplitude and the ratio between the two or more discrete energies are used to compute the volume fractions of the constituent phases in the multiphase fluid flow. These systems utilize ionizing radiation to interrogate the fluid which creates an inherent safety risk. Safety issues notwithstanding, the accuracy and operating envelope of this measurement technique is limited by the fluid flow regime and the sensitivity of the detector. There is a tradeoff between measurement time and accuracy—higher accuracy requires integrating measurements of flow for longer periods of time, which may average out important changes in the multiphase fluid flow. These systems also require periodic calibration in the field, due to the decay of the chemical radiation source.

Another type of multiphase metering system separates the fluid phases into independent fluid flow lines and uses single phase meters to measure each phase. Apparatuses that can achieve this result accurately in oilfield conditions are very large and expensive, and therefore difficult to incorporate.

An additional type of multiphase metering system measures the electrical impedance of the multiphase fluid flow to infer the volume fraction of constituent phases. The electrical impedance is composed of a real part which is a function of conductivity, and an imaginary part which is a function of permittivity. These systems measure the resistance and capacitance of the fluid to extrapolate the conductivity and permittivity of the fluid. The volume fractions of the constituent phases are estimated from these quantities. The accuracies of these systems are highly dependent on flow regime—the interconnectedness of each fluid phase may completely mitigate the response of the resistive or capacitive measurements. In general, these systems are unable to differentiate between the oil phase and the gas phase of the multiphase fluid flow, as these phases have nearly identical conductivity and permittivity. Ex-situ calibration of these systems is required if there is a change in the conductivity of the brine phase.

There is a need for a multiphase flow metering system which addresses the shortcomings of the above-described, and other, metering systems. The subject matter of the present disclosure addresses this need.

BRIEF SUMMARY

The present disclosure introduces systems and methodology for multiphase flow measurement that works accurately for a wide range of flow regimes and flow rates. The particular embodiments disclosed herein have been selected for their illustrative value and should not be relied upon to limit the scope of the subject matter contemplated herein. Generally, the systems and methodology disclosed herein minimize sources of error, like assumptions about slip rates between phases, the presence of invasive elements or hazardous elements, like radioactive sources, in multiphase flow.

The present disclosure introduces a novel way to measure phase-specific flow rates in a multiphase flow by briefly diverting the multiphase flow into a sample volume while maintaining the pressure at the entrance to the volume within a permissible pressure window. Because the upstream pressure remains relatively undisturbed, fluid flow rates leaving the upstream piping remain unchanged from their original flow rates. As a result, the resulting captured volumes of each phase will be proportional to the flow rates of each phase, even if the phases are moving at different velocities. In this manner, relatively slow changes in mean phase flow rates can be determined by sparsely sampling the phase flow rates in time and averaging, even though there may be large high-frequency fluctuations in flow rates.

More specifically, the fluid capture methodology of the present disclosure may be illustrated with reference to the schematic illustration of FIG. 1, where $P_w$ is the source or well head pressure (fixed)
P is pressure at arbitrary point midstream (dependent)
$P_d$ is pressure downstream (fixed)
$R_u$ is upstream piping resistance (fixed)
$R_d$ is downstream piping resistance (fixed)
R is resistance of meter (tunable)

For undiverted flow, the normal flow path of a multiphase fluid traveling along a primary production fluid flow segment is from $P_w$ to $P_d$. In steady state flow, the flow rate Q may be expressed as $$Q = \frac{Pw - Pd}{Ru + Rd},$$

which represents pressure drop over resistance. For steady state flow, the flow rate is the same at any point in the pipe, so it can also be represented as $$Q = \frac{Pw - P}{Ru}.$$

For diverted flow, the switch illustrated schematically in FIG. 1 is triggered so that the fluid path is diverted and $R_d$ is removed from the circuit to be replaced by R, and the flow rate can be expressed as $$Q = \frac{Pw - Pd}{Ru + R}.$$

In piping systems, it is often difficult to measure piping resistance, so the values of $R_u$ and $R_d$ are typically unknown. Pressures, by comparison, are easier to measure. Once the flow path has been diverted, P can be measured and compared to an earlier P value which existed before the flow path was diverted. Since $P_w$, $P_d$, and $R_u$ are fixed values, P can be adjusted by tuning only the value of R. Once P matches its pre-diverted value, it can be inferred that $R=R_d$. Furthermore, the Q value in steady state should also equal its pre-diverted value, because the total pressure drop and piping resistance remain unchanged.

According to the fluid capturing methodology of the present disclosure, the pressure P is measured while multiphase fluid is moving along the primary flow segment, i.e., its undiverted, normal flow path. Fluid is then diverted into the new resistive downstream fluid circuit, i.e., the diverted flow segment, and the pressure P is continuously read, and the value of R is adjusted to drive P to its pre-diverted value. The flow rate Q will converge to its pre-diverted value as the pressure P converges to its pre-diverted value. After the pressure P is stabilized, it will typically be advantageous to allow a sufficient volume of fluid to be captured in a fluidic isolation chamber so that the overwhelming majority of fluid that has been captured was captured at the correct flow rate. This will reduce error from any initial flow rate fluctuations. Once an appropriate volume of fluid has been captured for measurement, the multiphase fluid flow can be diverted back into the primary fluid flow segment, and the captured fluid volume can be analyzed. The total flow rate can be determined by dividing the volume of fluid that was captured by the total time of the capture.

For example, and not by way of limitation, in accordance with one particular embodiment of the present disclosure, a system for measuring phase flow rates of a multiphase production fluid is provided. The system comprises fluidic piping, a fluidic isolation chamber, a pressure-regulating actuator, an upstream fluidic pressure sensor, a fluidic phase detector, and a fluidic control and analysis unit. The fluidic piping comprises a primary production fluid flow segment, a diverted flow segment, and a production fluid diversion point in the primary production fluid flow segment. The diverted flow segment extends downstream from the production fluid diversion point to the fluidic isolation chamber, parallel to a portion of the primary production fluid flow segment downstream of the production fluid diversion point. The fluidic isolation chamber expands volumetrically in response to fluid pressure when multiphase production fluid is diverted through the diverted flow segment at the production fluid diversion point. The pressure-regulating actuator is operable to regulate fluid pressure upstream of the fluidic isolation chamber. The upstream fluidic pressure sensor generates an upstream fluidic pressure signal that is indicative of the fluid pressure upstream of the fluidic isolation chamber. The fluidic control and analysis unit is configured to (i) communicate with the upstream pressure sensor and the isolation chamber actuator to maintain fluidic pressure upstream of the fluidic isolation chamber as the multiphase production fluid is diverted to the fluidic isolation chamber, (ii) generate a total flow rate $Q_{TOT}$ for the multiphase production fluid as a function of a chamber filling time t and a volumetric expansion $\Delta V$ of the fluidic isolation chamber in response to fluid pressure introduced when multiphase production fluid is diverted through the diverted flow segment at the production fluid diversion point, (iii) communicate with the fluidic phase detector to generate a relative occupancy indicator I for a target phase of a multiphase production fluid in the fluidic isolation chamber, and (iv) generate a flow rate $Q_P$ for the target phase as a function of the total flow rate $Q_{TOT}$ of the multiphase production fluid and the relative occupancy indicator I for the target phase.

Methods for measuring phase flow rates of a multiphase production fluid are also provided.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 4-6 illustrate a few of the many alternative fluidic phase detector configurations contemplated by the present disclosure;

DETAILED DESCRIPTION

Figure 1:
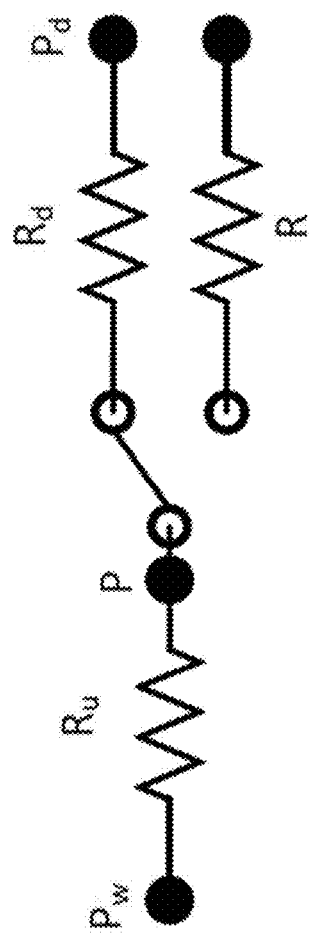
FIG. 1 is a schematic illustration of the fluid capture methodology of the present disclosure.
Figure 2:
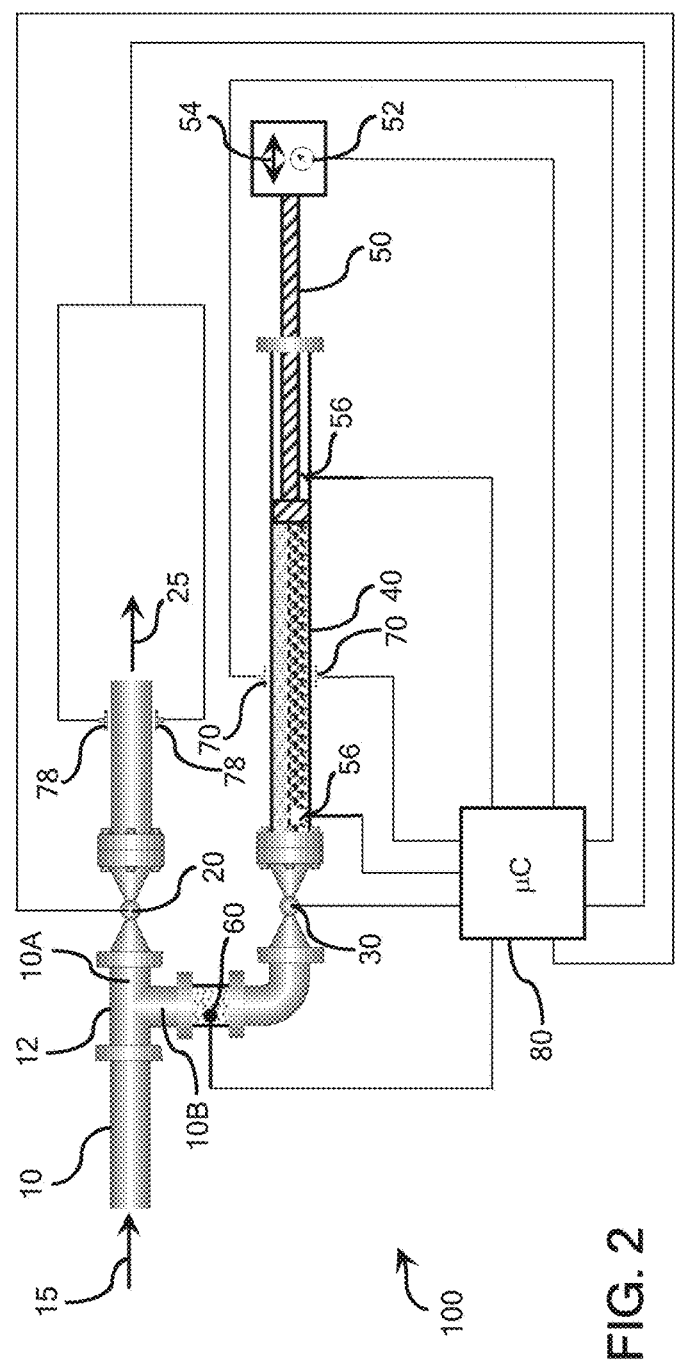
FIG. 2 illustrates systems and methodology for analyzing a multiphase production fluid according to the present disclosure.

FIG. 2 illustrates a system 100 for measuring phase flow rates of a multiphase production fluid according to the present disclosure. As is illustrated in FIG. 2, the system may comprise fluidic piping 10, an expandable fluidic isolation chamber 40, an upstream fluidic pressure sensor 60, fluidic phase detectors 70, a fluidic control and analysis unit 80, and one or more pressure regulating actuators operably coupled to expandable fluidic isolation chamber 40.

In the embodiment illustrated in FIG. 2, the sealed isolation chamber piston 50 or one or more of the illustrated flow control valves, i.e., the production fluid diverter valve 20 and/or the production fluid isolation valve 30, can be used separately or together as the pressure regulating actuator because each is operably coupled to the fluidic isolation chamber 40. More specifically, the sealed isolation chamber piston 50, which moves within the fluidic isolation chamber 40, can be used as the pressure-regulating actuator because it regulates fluid pressure upstream of the fluidic isolation chamber 40 by controlling the volumetric expansion of the fluidic isolation chamber 40. The movement of the piston 50 may be controlled to increase or decrease pressure upstream of the fluidic isolation chamber 40. It is also contemplated that this movement may merely be passive, i.e., it may merely occur in response to the flow of multiphase production fluid 15 into the isolation chamber 40.

Similarly, the production fluid isolation valve 30 can be used as the pressure regulating actuator because it regulates fluid pressure upstream of the fluidic isolation chamber 40 by controlling the rate at which multiphase production fluid is introduced into the fluidic isolation chamber 40.

The diverter valve 20 and the isolation valve 30 permit undiverted flow of multiphase production fluid 15 with the diverter valve 20 opened and the isolation valve 30 closed. The fluidic piping 10 also permits diverted flow of multiphase production fluid 15 to the isolation chamber 40 with the isolation valve 30 opened and the diverter valve 20 closed.

The fluidic piping 10 comprises a primary production fluid flow segment 10A, a diverted flow segment 10B, and a production fluid diversion point 12 in the primary production fluid flow segment 10A. The diverted flow segment 10B extends downstream from the production fluid diversion point 12 to the fluidic isolation chamber 40, parallel to a portion of the primary production fluid flow segment 10A downstream of the production fluid diversion point 12. The fluidic isolation chamber 40 expands volumetrically in response to fluid pressure when multiphase production fluid is diverted through the diverted flow segment 10B at the production fluid diversion point 12. As used herein, a fluidic piping configuration presents "parallel" flow segments when the multiphase production fluid in a pipeline is presented with two or more piping paths through which it may flow. The use of the term "parallel" herein is not intended to require that the fluidic piping segments are geometrically parallel to each other. For example, in the configuration illustrated in FIG. 2, the fluidic piping 10 defines parallel flow segments, beginning at the diversion point 12, to the diverter valve 20 and the isolation valve 30.

The upstream fluidic pressure sensor 60 generates an upstream fluidic pressure signal that is indicative of fluid pressure upstream of the fluidic isolation chamber 40. In operation, the components of the system 100 are used to divert a multiphase production fluid 15 at the production fluid diversion point 12 to the fluidic isolation chamber 40 while one or more pressure-regulating actuators, for example, the sealed isolation chamber piston 50 or a flow control valve downstream of the fluid diversion point 12, can be provided to regulate fluid pressure upstream of the fluidic isolation chamber 40. More specifically, the pressure of the flowing multiphase production fluid 15 upstream of the fluidic isolation chamber 40 is maintained operationally constant, or within a permissible window.

The upstream fluidic pressure sensor 60, may be positioned at a variety of locations upstream of the fluidic isolation chamber 40, as long as the location allows for the generation of upstream fluidic pressure signals that represents fluidic pressure in the multiphase production fluid 15 at moments before, during, and after diversion of multiphase production fluid 15 into the isolation chamber 40. It is also contemplated that the upstream fluidic pressure sensor 60 may take the form of a plurality of pressure sensors at different locations in the fluidic piping 10. As is described in greater detail below, the signal from the upstream fluidic pressure sensor 60 can be used in a feedback loop with the isolation chamber piston 50 to control expansion of the fluidic isolation chamber 40 and maintain the pressure of the flowing multiphase production fluid 15 upstream of the fluidic isolation chamber 40 as the multiphase production fluid is diverted to the fluidic isolation chamber 40. In practice, it will often be sufficient to ensure that the pressure of the flowing multiphase production fluid 15 upstream of the fluidic isolation chamber 40 is maintained within a permissible pressure window. It is contemplated that the magnitude of a suitable pressure window will vary depending on specific flow conditions.

In many instances, the aforementioned pressure maintenance can be enhanced if the fluidic control and analysis unit 80 is configured to synchronize operation of the diverter valve 20 and the isolation valve 30 as the multiphase production fluid 15 is diverted to the fluidic isolation chamber 40. Further, it is contemplated that the flow rate calculations of the present disclosure, which are described in further detail below, may be optimized if the aforementioned pressure control is affected by maintaining the fluidic pressure upstream of the fluidic isolation chamber 40 operationally constant. The term "operationally constant" accounts for pressure variations that would not ordinarily be considered strictly "constant" and is utilized herein to allow for a degree of pressure variation that would ordinarily be present in an un-diverted flow of the multiphase production fluid over the time it takes to fill the fluidic isolation chamber 40 with the diverted multiphase production fluid.

The fluidic control and analysis unit 80 communicates with the diverter valve 20 and the isolation valve 30 to divert multiphase production fluid 15 to the fluidic isolation chamber and to isolate the multiphase production fluid 15 in the fluidic isolation chamber 40 for analysis by the fluidic phase detectors 70. The fluidic phase detectors 70 are used in cooperation with the fluidic control and analysis unit 80 to measure the total volumetric flow rate and individual volumetric flow rates of each fluid phase in the multiphase production fluid 15. Although a plurality of fluidic phase detectors 70 are illustrated in FIG. 2, it is contemplated that a single phase detector, or any configuration of a plurality of phase detectors may be utilized to achieve the objective of the present disclosure, as is described in further detail below. Additionally, it is noted that terms like "communicate" and "communication," as used herein, are intended to encompass one-way and two-way communication.

The fluidic control and analysis unit 80 can be configured to maintain a proper fluidic pressure upstream of the fluidic isolation chamber 40 as the multiphase production fluid 15 is diverted to the fluidic isolation chamber 40 by programming the fluidic control and analysis unit 80 to execute a feedback routine in a feedback loop comprising the upstream fluidic pressure sensor 60 and a suitable pressure-regulating actuator, such as the isolation chamber piston 50, one of the flow control valves 20, 30, or a combination thereof. It is noted that the response time and accuracy of the control and analysis unit 80, which may comprise a memory module and a programmable controller, will depend upon the particular performance characteristics of the unit 80 and the particular pressure-regulating actuator chosen for use.

The fluidic control and analysis unit 80 can be further configured to generate a total flow rate $Q_{TOT}$ for the multiphase production fluid as a function of a chamber filling time t and a volumetric expansion $\Delta V$ of the fluidic isolation chamber 40 in response to fluid pressure introduced when multiphase production fluid is diverted through the diverted flow segment 10B at the production fluid diversion point 12. As is described in detail below, the fluidic control and analysis unit 80 communicates with the fluidic phase detector 70 to generate a relative occupancy indicator I for a target phase of the multiphase production fluid in the fluidic isolation chamber 40, and generates a flow rate $Q_P$ for the target phase. This flow rate $Q_P$ is a function of the total flow rate $Q_{TOT}$ of the multiphase production fluid and the relative occupancy indicator I for the target phase.

The fluidic control and analysis unit 80 can be configured to generate the total flow rate $Q_{TOT}$ as a function of the chamber filling time and the volumetric expansion $\Delta V$ of the fluidic isolation chamber 40 because the volumetric expansion $\Delta V$ will correlate directly with the volume of the fluid diverted to the fluidic isolation chamber 40. The chamber filling time can be established as extending from a point in time at which the isolation valve 30 is opened and the isolation chamber actuator 50 begins to move in the fluidic isolation chamber 40 to a subsequent point in time at which the isolation valve 30 is closed and the isolation chamber actuator 50 ceases to move in the fluidic isolation chamber 40. In this case, the volumetric expansion $\Delta V$ will correspond to the volume of the fluidic isolation chamber 40, as limited by the isolation chamber actuator 50, when the isolation valve 30 is subsequently closed and the isolation chamber actuator 50 ceases to move.

By utilizing the pressure-controlled volumetric expansion $\Delta V$ of the fluidic isolation chamber 40 to create an input for the flow rate generation of the present disclosure, phase-specific flow rates can be generated regardless of fluid composition, without loss of accuracy, even where the gas volume percentage of the multiphase production fluid nears 100%, and even where solids are present in the flow. As will be appreciated by those practicing the concepts of the present disclosure, it may be advantageous in generating the total flow rate $Q_{TOT}$, to account for the fact that fluidic flow valves do not typically open and close instantaneously, creating a ramp-up and ramp-down of the flow rate of the diverted fluid as the diverter valve and isolation valve are opened and closed. It is contemplated, for example, that the volumetric expansion $\Delta V$ of the fluidic isolation chamber 40 can be taken as a calibrated value and the chamber filling time, i.e., the amount of time it takes the actuator to move from an initial position near the start of the fluidic diversion operation, to a subsequent position near the end of the fluidic diversion operation, can be corrected to account for reduced actuator velocities that would occur as the valves are opened and closed.

Figure 3:
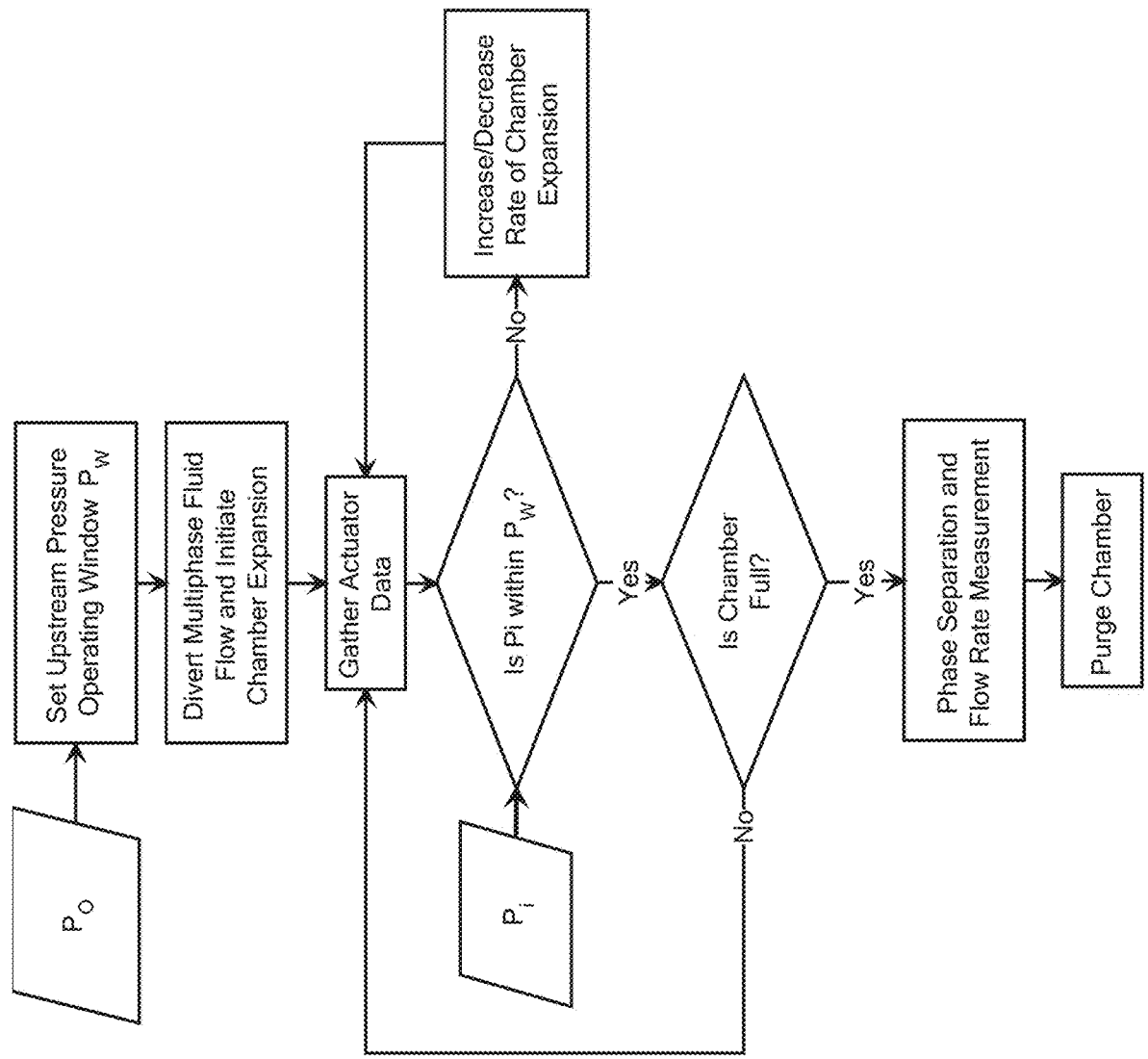
FIG. 3 is a flowchart illustrating aspects of the methodology of the present disclosure.

The flowchart of FIG. 3 provides an alternative illustration of specific aspects of the methodology of the present disclosure, where $P_O$ represents the upstream operating pressure of a multiphase production fluid flow, $P_W$ represents the aforementioned pressure window, and $P_i$ represents real time pressure sensed by the aforementioned upstream pressure sensor. In the illustrated embodiment, The upstream operating pressure $P_O$, which may be measured by an upstream pressure sensor or determined in some other manner, is used to establish the upstream pressure operating window $P_W$, prior to diverting the multiphase fluid flow into the aforementioned fluidic isolation chamber. Once flow diversion and expansion of the fluidic isolation chamber has been initiated, actuator data is gathered to inform the subsequent flow rate calculations, and the aforementioned fluidic control and analysis unit is used to continuously examine whether the real time upstream pressure $P_i$ is within the upstream pressure operating window $P_W$. If not, the rate of chamber expansion, as controlled by the aforementioned isolation chamber actuator, is controlled to move the real time upstream pressure $P_i$ within the upstream pressure operating window $P_W$. Phase separation is completed, and flow rate measurement is implemented, once the fluidic isolation chamber is full. In the final step, the diverted multiphase fluid can be purged from the fluidic isolation chamber by using the isolation chamber actuator to either return it to the primary multiphase fluid flow or otherwise dispose of the fluid.

A variety of techniques may be implemented to enhance phase separation in the fluidic isolation chamber 40 including, for example, electrostatic phase separation, emulsion breaking chemical treatment, assisted G-force (centrifugal) separation, or combinations thereof. It is also contemplated that a small scale phase separation device may be positioned upstream of, or integrated with, the fluidic isolation chamber 40.

The fluidic control and analysis unit 80 also communicates with the fluidic phase detectors 70 to generate a relative occupancy indicator I for a target phase of the multiphase production fluid 15 in the fluidic isolation chamber 40. Given the relative occupancy indicator I, which is described in further detail below, the fluidic control and analysis unit 80 additionally generates a flow rate $Q_P$ for the target phase, i.e., either the oil, gas, or water phase, or some combination thereof. This flow rate $Q_P$ is generally a function of the previously generated total flow rate $Q_{TOT}$ and the relative occupancy indicator I for the target phase.

More specifically, regarding the relative occupancy indicator I, it is noted that the fluidic phase detector 70 can be configured to actively or passively detect separation of multiple phases of a multiphase production fluid in the fluidic isolation chamber 40, and that the fluidic control and analysis unit 80 may generate a single relative occupancy indicator for a single phase of the multiphase production fluid or separate relative occupancy indicators for different phases of the multiphase production fluid. In either case, the fluidic control and analysis unit 80 can be configured to generate the relative occupancy indicator I from a laminar dimension of the target phase in the fluidic isolation chamber 40 or from an image of the multiphase production fluid in the fluidic isolation chamber 40. For example, and not by way of limitation, the laminar dimension of the target phase may comprise laminar data representing a thickness and position of the target phase along the height of the fluidic isolation chamber 40 or a cross-sectional area of the target phase in the fluidic isolation chamber 40.

The relative occupancy indicator I and the corresponding isolated volume of each phase in the fluidic isolation chamber 40 may be generated in several ways. For example, referring to FIG. 4, as the multiphase production fluid in the fluidic isolation chamber separates into distinct laminar phases A, B, C, a single fluidic phase detector 70 in the form of, e.g., a transceiver, may be positioned at the bottom of the fluidic isolation chamber 40, and can be driven to send pulses of acoustic, electromagnetic, or optical energy into the laminar multiphase production fluid, normal to the separated fluid layers of the fluid. Reflections off of the fluid interfaces between the layers of each phase can be detected by the transceiver. The time delay between the transmitted pulse and each subsequent reflection can be taken as an indication of the thickness of the separated fluid layer, and the position of the layer in the fluidic isolation chamber 40. For fluidic isolation chambers with a circular cross section, the relative volume, or other relative occupancy indicator, of the target phase will be a function of both of these variables, in addition to the known ID of the fluidic isolation chamber 40.

Referring to FIG. 5, in other embodiments, the volume of each separated fluid phase in the isolation chamber 40 may be measured with an array of fluidic phase detectors 74, in the form of transceivers, arranged normal to the separated layers of each phase A, B, C. The array 74 measures the acoustic, electromagnetic, X-ray, nuclear or optical properties of the fluid in the immediate vicinity of each sensing element. The height of each separated fluid layer A, B, C can be estimated by examining the distribution of measured fluid properties across the array, identifying transceivers that generate similar properties, and correlating those transceivers with different fluid phases. The volume of each phase is then estimated from the position of each phase in the isolation chamber 40 and the known ID of the chamber 40.

Referring to FIG. 6, in still further embodiments, it is contemplated that the volume of each separated fluid phase A, B, C in the fluidic isolation chamber 40 may be measured with one or more alternative arrays of fluidic phase detectors 76, arranged as transceivers, receiver/transmitter pairs or in any suitable manner for measuring the properties of the bulk fluid in the fluidic isolation chamber 40. The alternative arrays fluidic phase detectors 76 can be used to measure the acoustic, electromagnetic, X-ray, nuclear, or optical properties of the bulk fluid. A tomographic image can be reconstructed from this data and the cross-sectional area of each fluid phase can be determined from the tomographic image. The volume of each phase can be estimated based on the respective cross-sectional areas of each phase A, B, C, and the fixed volume of fluidic isolation chamber 40.

It is also contemplated that a null response from a transceiver which is non-responsive to a particular phase can be used to estimate the volume of the non-responsive phase in the separated fluid of the fluidic isolation chamber 40. For example, a capacitive sensor which is shorted-out by brines can be used to measure the volume content of brine in the separated fluid by detecting the area in which response is shorted compared to other areas with detectability. In this way, particular kinds of transceivers which are non-responsive to a particular phase is extended in the separated fluid of the fluidic isolation chamber 40.

In additional embodiments, X-ray measurements, for example, could be performed quickly after the sample is drawn from the multiphase production fluid 15, eliminating the need to wait for the fluid components to separate. More specifically, once a flow sample is captured in the fluidic isolation chamber 40, the volumes of each phase can be measured using total x-ray attenuation, i.e., by using two or more different X-ray wavelengths where the separate attenuations of different phases, like brine, oil, and gas, are different. In some instances, the attenuation from one of the phases, like gas, would be negligible. Accordingly, the present disclosure contemplates that the fluidic control and analysis unit 40 can be configured to generate the relative occupancy indicator I of the target phase, separated from or intermixed with other phases of the multiphase production fluid in the fluidic isolation chamber 40.

It is contemplated that the separation of fluids in the fluidic isolation chamber can be accelerated through the use of acoustic separation techniques, electromagnetic separation techniques, chemical treatment separation techniques, and kinetic separation techniques. These methods would decrease the time delay waiting on fluids to buoyantly separate in the fluidic isolation chamber.

Figure 7A:
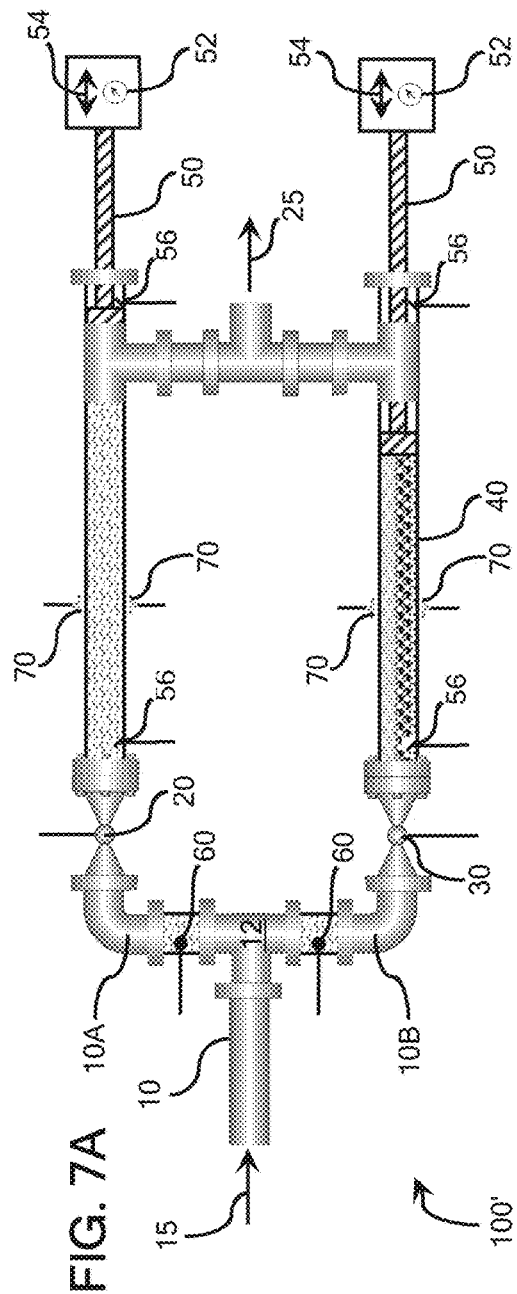
FIGS. 7A and 7B illustrate alternative systems and methodology for analyzing a multiphase production fluid according to the present disclosure, where like structure is illustrated with like reference numerals.

FIG. 7A illustrates a system 100' for measuring phase flow rates of a multiphase production fluid, where parallel fluidic isolation chambers 40 and corresponding fluidic phase detectors 70 can be associated with each of the parallel flow segments of the fluidic piping 10. Each parallel fluidic isolation chamber 40 comprises an isolation chamber actuator 50. The fluidic control and analysis unit, which is omitted from the illustration for clarity, is configured to alternate identities of the diverter valve 20 and the isolation valve 30 to facilitate alternating isolation of the multiphase production fluid 15 in the parallel fluidic isolation chambers 40. The fluidic control and analysis unit 80 also alternates communication with the parallel fluidic phase detectors 70 to generate relative occupancy indicators I for target phases of a multiphase production fluid 15 isolated in each of the parallel fluidic isolation chambers 40. In this manner, as one fluidic isolation chamber is filled and the phases of the isolated fluid are allowed to separate, flow can continue through the other of the fluidic isolation chambers. This embodiment permits more rapid isolation of a multiphase production fluid in the respective parallel isolation chambers because the multiphase production fluid is already present in the fluidic isolation chamber when it is set to be transitioned to active isolation. In this way, the number of fluid samples can be increased to decrease the sparsity of the fluid samples in time.

Figure 7B:
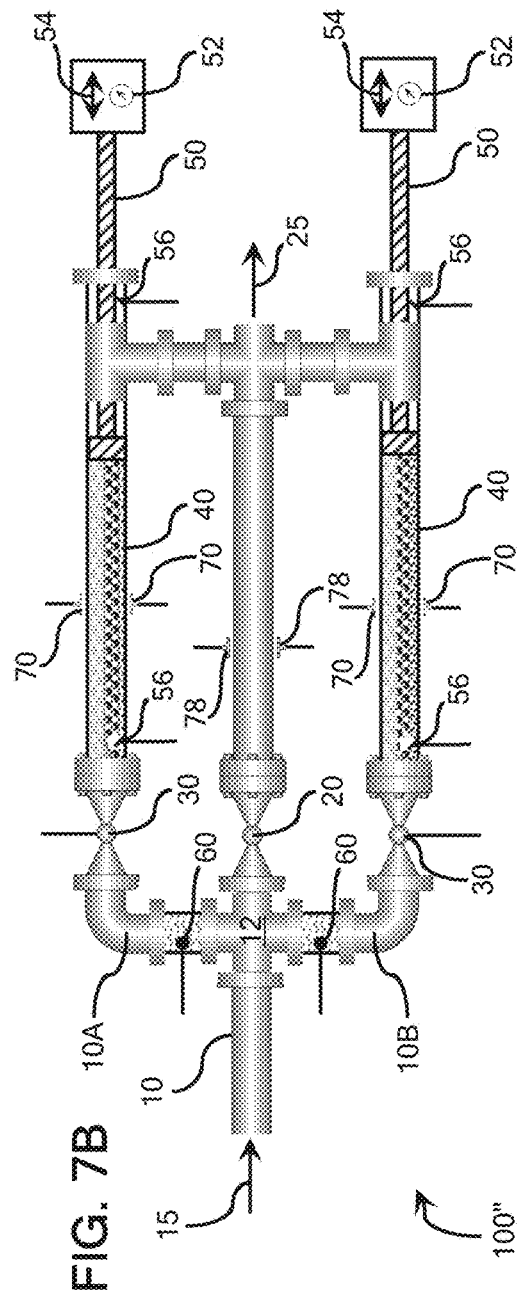

FIG. 7B presents an alternative system 100" for measuring phase flow rates of a multiphase production fluid, where parallel fluidic isolation chambers 40 and corresponding isolation chamber actuators 50 and fluidic phase detectors 70 are provided. In this embodiment, a dedicated diverter valve 20 is maintained in the primary flow path 25 and an isolation valve 30 is provided in each of the parallel flow segments of the fluidic piping. In this embodiment, the fluidic control and analysis unit, which is omitted from the illustration for clarity, can utilize each of the parallel fluidic isolation chambers 40 without the need to alternate identities of the diverter valve 20 and the isolation valves 30.

Figure 8:
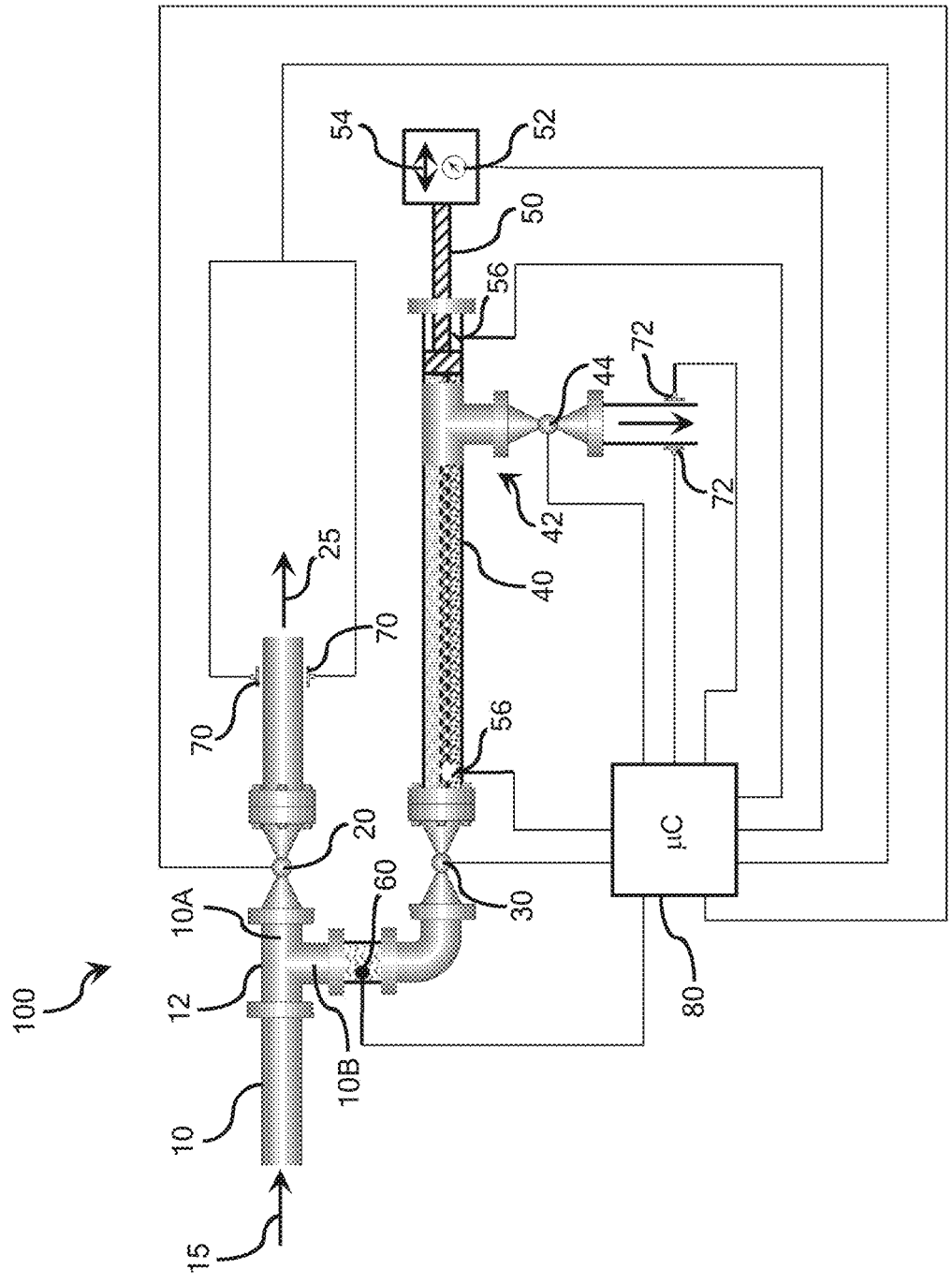
FIG. 8 illustrates an additional alternative system and methodology for analyzing a multiphase production fluid according to the present disclosure, where like structure is illustrated with like reference numerals.

FIG. 8 illustrates an alternative embodiment where alternative fluidic phase detectors 72 are positioned to actively or passively detect separation of multiple phases of a multiphase production fluid as the fluid exits the fluidic isolation chamber 40. In such embodiments, the fluidic phase detectors 72 and the fluidic control and analysis unit 80 would be configured to distinguish between distinct phases of the multiphase production fluid as each phase of the fluid exits the fluidic isolation chamber 40, identify a duration of discharge for each phase, or a target phase, and generate the corresponding relative occupancy indicators I for each phase based on the duration of discharge of each phase.

More specifically, referring to the alternative fluidic phase detectors 72 positioned at the isolation chamber discharge 42, the volumetric portions of each phase can be determined by opening an isolation chamber discharge valve 44 when the multiphase production fluid in the fluidic isolation chamber 40 is sufficiently separated, allowing the separated phases to flow through the discharge path, past the alternative fluidic phase detectors 72. The additional or alternative fluidic phase detectors 72 measure properties of the discharged fluid, such as, for example, the density, viscosity, compressibility, acoustic properties, refractive index, optical absorption, x-ray absorption, permittivity, conductivity, etc., of the fluid. As each phase of the fluid flows out of the discharge path, each phase can be distinguished from the other phases, based on its detected properties. By logging the response of the detectors 72 over time, the duration of time at which the detectors 72 sense values consistent with a unique phase, coupled with the flow rate out of the discharge path, indicates the volume of each phase. The fluidic control and analysis unit 80 can then generate occupancy indicators for one or more phases as each phase passes the additional or alternative fluidic phase detectors 72.

As is described above, the flow rate of each phase in the multiphase flow can be calculated by dividing the volume occupied by each phase in the fluidic isolation chamber 40 by the time it took for the isolation chamber filling operation to complete. After the measurement process is complete, the discharge valve 44 is closed, the isolation valve 30 is opened, the isolation chamber actuator 50 is actuated back to its initial position, and the system 100 is ready for another measurement cycle.

Returning to FIG. 2, it is contemplated that the system 100 may further comprise a calibrated multiphase flow detector(s) 78 positioned for phase detection outside of the fluidic isolation chamber 40. In this embodiment, the fluidic control and analysis unit 80 is configured to calibrate the calibrated multiphase flow detector(s) 78 as a function of the flow rate $Q_P$ generated for the target phase of the multiphase production fluid in the fluidic isolation chamber 40. As the fluidic phase detectors 70 and the fluidic control and analysis unit 80 are used to analyze the separated fluids in the fluidic isolation chamber 40, the flow rate values generated in the fluidic isolation chamber 40 can be used to effectively calibrate the multiphase flow detector(s) 78 so these detector(s) 78 can be used to determine a dynamic range of measurements in the primary flow path 25. For example, in a liquids-only flow, if separated water and oil are measured, these calibrated values can be used in the primary flow path to provide bounds for the calibrated primary flow path detectors to provide a real-time calibrated water cut measurement.

It is also contemplated that the fluidic control and analysis unit 80 can be configured to generate a series of flow rates $Q_P$ over time, for different samples of multiphase production fluid in the fluidic isolation chamber 40, and average the generated series of flow rates $Q_P$ to account for flow rate fluctuations over the series. By doing so, those practicing the concepts of the present disclosure will be able to emphasize relatively slow changes in mean phase flow rates over any relatively large high-frequency fluctuations in the flow rates. More specifically, in many cases it is most advantageous to look at average phase flow rate data for reservoir management, particularly because average phase flow rates change slowly over time, i.e., over a scale of days to years. In contrast, the instantaneous flow rates of turbulent multiphase flows will typically fluctuate rapidly over relatively short periods of time, i.e., over a few seconds or fractions of a second. The present inventors have recognized that a long-term average of a series of flow rate values can be determined from sparse time sampling of flow rates, even if this sparse sampling represents an under-sampling of the relatively high frequency flow rate fluctuations.

Although, in the illustrated embodiments, the actuator 50 is configured to retract as diverted fluid enters the fluidic isolation chamber 40, it is contemplated that the orientation of the actuator 50 could be reversed so that it advances as diverted fluid enters the fluidic isolation chamber 40. It is also contemplated that the isolation chamber 40 may take the form of an expandable balloon.

The system 100 may further comprise an actuator position sensor 52 that generates an actuator position signal, which can be used to generate an indication of the volume of the multiphase production fluid in the fluidic isolation chamber 40, because the starting and ending positions of the actuator 50 can be used to indicate the volume of the fluid diverted to the fluidic isolation chamber 40. The fluidic control and analysis unit 80 may communicate with the actuator position sensor 52 and use the actuator position signal, and the generated volume indication, to generate the total flow rate $Q_{TOT}$ for the multiphase production fluid.

It is contemplated that the actuator position sensor 52 can be provided as an integral component of an actuator driver 54, or as an independent position sensor. For example, and not by way of limitation, the actuator 50 may comprise a driver 54 with an integrated encoder or LVDT functioning as an integral position sensor 52. Alternatively, an independent position sensor 52 can be positioned along the length of the actuator 50 to provide an independent measurement of the position of the actuator 50.

The actuator driver 54 can be configured to control a position of the actuator 50 within the fluidic isolation chamber 40 and the fluidic control and analysis unit 80 may communicate with the actuator driver 54 to coordinate positioning of the actuator 50 with diversion of the multiphase production fluid 15 to the fluidic isolation chamber 40. Limit switches 56 can be used to help control maximum advancement and retraction of the actuator 50 within the fluidic isolation chamber 40. The fluidic control and analysis unit 80 communicates with the actuator driver 54 to further coordinate positioning of the actuator 50 with generation of the relative occupancy indicator I. Once the relative occupancy indicator I has been generated, the isolation valve 30 can be opened and the actuator 50 can be advanced within the fluidic isolation chamber to return the formerly isolated fluid to the primary flow path 25. Alternatively, the formerly isolated fluid may be purged from the fluidic isolation chamber 50 via the isolation chamber discharge 42 or other purge port.

For the purposes of describing and defining the present invention it is noted that the terms "about" and "approximately" are utilized herein to represent the inherent degree of uncertainty that may be attributed to any quantitative comparison, value, measurement, or other representation. The terms "about" and "approximately" are also utilized herein to represent the degree by which a quantitative representation may vary from a stated reference without resulting in a change in the basic function of the subject matter at issue.

For the purposes of describing and defining the present invention, it is noted that reference herein to a calculation or other determination being a "function of" a value, parameter, variable, or other construct, is not intended to denote that the determination is exclusively a function of the listed value, parameter, variable, or other construct. Rather, reference herein to a determination that is a "function of" a listed construct is intended to be open ended such that the determination may be a function of a single construct or a plurality of constructs.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the terms "in which" and "wherein" as transitional phrases. For the purposes of defining the present invention, it is noted that these terms are introduced in the claims as an open-ended transitional phrase that is used to introduce a given number of claim elements and should be interpreted in like manner as the more commonly used open-ended preamble term "comprising."

What is claimed is:

1. A system for measuring phase flow rates of a multiphase production fluid, the system comprising fluidic piping, a fluidic isolation chamber, a pressure-regulating actuator, an upstream fluidic pressure sensor, a fluidic phase detector, and a fluidic control and analysis unit, in which:
the fluidic piping comprises a primary production fluid flow segment, a diverted flow segment, and a production fluid diversion point in the primary production fluid flow segment;
the diverted flow segment extends downstream from the production fluid diversion point to the fluidic isolation chamber, parallel to a portion of the primary production fluid flow segment downstream of the production fluid diversion point;
the fluidic isolation chamber expands volumetrically in response to fluid pressure when multiphase production fluid is diverted through the diverted flow segment at the production fluid diversion point;
the pressure-regulating actuator is operable to regulate fluid pressure upstream of the fluidic isolation chamber;
the upstream fluidic pressure sensor generates an upstream fluidic pressure signal that is indicative of the fluid pressure upstream of the fluidic isolation chamber; and
the fluidic control and analysis unit is configured to
communicate with the upstream pressure sensor and the isolation chamber actuator to maintain fluidic pressure upstream of the fluidic isolation chamber as the multiphase production fluid is diverted to the fluidic isolation chamber,
generate a total flow rate $Q_{TOT}$ for the multiphase production fluid as a function of a chamber filling time t and a volumetric expansion $\Delta V$ of the fluidic isolation chamber in response to fluid pressure introduced when multiphase production fluid is diverted through the diverted flow segment at the production fluid diversion point,
communicate with the fluidic phase detector to generate a relative occupancy indicator I for a target phase of a multiphase production fluid in the fluidic isolation chamber, and
generate a flow rate $Q_P$ for the target phase as a function of the total flow rate $Q_{TOT}$ of the multiphase production fluid and the relative occupancy indicator I for the target phase.

2. The system as claimed in claim 1 wherein the pressure-regulating actuator comprises a flow control valve that is operable to regulate fluid pressure upstream of the fluidic isolation chamber by controlling a rate at which multiphase production fluid is introduced into the fluidic isolation chamber.

3. The system as claimed in claim 2 wherein the flow control valve comprises an isolation valve positioned in the diverted flow segment, a diverter valve positioned in the primary flow segment, or both.

4. The system as claimed in claim 2 wherein:
the flow control valve comprises an isolation valve positioned in the diverted flow segment and a diverter valve positioned in the primary flow segment; and
the fluidic control and analysis unit is configured to communicate with the diverter valve and the isolation valve to divert multiphase production fluid to the fluidic isolation chamber and to isolate the multiphase production fluid in the fluidic isolation chamber for analysis by the fluidic phase detector.

5. The system as claimed in claim 1 wherein the pressure-regulating actuator comprises a sealed piston that is operable to regulate fluid pressure upstream of the fluidic isolation chamber by controlling the volumetric expansion of the fluidic isolation chamber.

6. The system as claimed in claim 1 wherein the pressure-regulating actuator is operable to regulate fluid pressure upstream of the fluidic isolation chamber by controlling the volumetric expansion of the fluidic isolation chamber and by controlling a rate at which multiphase production fluid is introduced into the fluidic isolation chamber.

7. The system as claimed in claim 1 wherein the fluidic control and analysis unit is configured to maintain fluidic pressure upstream of the fluidic isolation chamber by executing a feedback routine in a feedback loop comprising the upstream fluidic pressure sensor and the pressure-regulating actuator.

8. The system as claimed in claim 7 wherein the upstream fluidic pressure signal is indicative of the fluid pressure at, or upstream of, the fluidic isolation chamber and the production fluid diversion point.

9. The system as claimed in claim 1 wherein:
the pressure-regulating actuator comprises an isolation valve positioned in the diverted flow segment and a diverter valve positioned in the primary flow segment for controlling a rate at which multiphase production fluid is introduced into the fluidic isolation chamber;
the fluidic control and analysis unit is configured to communicate with the diverter valve and the isolation valve to divert multiphase production fluid to the fluidic isolation chamber and to isolate the multiphase production fluid in the fluidic isolation chamber for analysis by the fluidic phase detector; and
the fluidic control and analysis unit is configured to maintain fluidic pressure upstream of the fluidic isolation chamber by synchronizing operation of the diverter valve and the isolation valve as the multiphase production fluid is diverted to the fluidic isolation chamber.

10. The system as claimed in claim 1 wherein the fluidic control and analysis unit is configured to maintain fluidic pressure upstream of the fluidic isolation chamber by controlling the pressure-regulating actuator to maintain the fluidic pressure upstream of the fluidic isolation chamber operationally constant as the multiphase production fluid is diverted to the fluidic isolation chamber.

11. The system as claimed in claim 1 wherein:
the fluidic phase detector actively or passively detects separation of multiple phases of a multiphase production fluid in the fluidic isolation chamber; and
the fluidic control and analysis unit is configured to generate the relative occupancy indicator I from a laminar dimension of the target phase in the fluidic isolation chamber.

12. The system as claimed in claim 1 wherein:
the fluidic phase detector actively or passively detects separation of multiple phases of a multiphase production fluid in the fluidic isolation chamber; and
the fluidic control and analysis unit is configured to generate the relative occupancy indicator I from a measurement of a cross-sectional area of the target phase in the fluidic isolation chamber.

13. The system as claimed in claim 1 wherein:
the fluidic phase detector actively or passively detects separation of multiple phases of a multiphase production fluid in the fluidic isolation chamber; and the fluidic control and analysis unit is configured to generate the relative occupancy indicator I from an image of the multiphase production fluid in the fluidic isolation chamber.

14. The system as claimed in claim 1 wherein:
the fluidic phase detector actively or passively detects multiple intermixed phases of a multiphase production fluid in the fluidic isolation chamber; and
the fluidic control and analysis unit is configured to generate the relative occupancy indicator I from X-ray attenuation measurements.

15. The system as claimed in claim 1 wherein the system is configured to return a formerly isolated multiphase production fluid to a portion of the fluidic piping upstream of the diverter valve by opening the isolation valve and purging the fluidic isolation chamber after the relative occupancy indicator I has been generated.

16. The system as claimed in claim 1 wherein the fluidic phase detector actively or passively detects separation of multiple phases of a multiphase production fluid as the fluid exits the fluidic isolation chamber.

17. The system as claimed in claim 1 wherein the fluidic phase detector and the fluidic control and analysis unit are configured to distinguish between distinct phases of the multiphase production fluid as the fluid exits the fluidic isolation chamber, identify a duration of discharge for the target phase, and generate the relative occupancy indicator I for the target phase based on the duration of discharge for the target phase.

18. The system as claimed in claim 1 wherein the system comprises a plurality of fluidic phase detectors actively or passively detecting separation of multiple phases of a multiphase production fluid in the fluidic isolation chamber, as the fluid exits the fluidic isolation chamber, or both.

19. The system as claimed in claim 1 wherein the fluidic control and analysis unit is configured to generate the total flow rate $Q_{TOT}$ as a function of the chamber filling time and the volumetric expansion $\Delta V$ of the fluidic isolation chamber.

20. The system as claimed in claim 19 wherein:
the chamber filling time extends from a point at which the isolation valve is opened and the isolation chamber actuator begins to move in the fluidic isolation chamber to a subsequent point at which the isolation valve is closed and the isolation chamber actuator ceases to move in the fluidic isolation chamber; and
the volumetric expansion $\Delta V$ corresponds to a net increase in the volume of the fluidic isolation chamber when the isolation valve is subsequently closed and the isolation chamber actuator ceases to move.

21. The system as claimed in claim 1 wherein:
the system further comprises a calibrated multiphase flow detector positioned for phase detection outside of the fluidic isolation chamber; and
the fluidic control and analysis unit is configured to calibrate the calibrated multiphase flow detector as a function of the flow rate $Q_P$ generated for the target phase of the multiphase production fluid in the fluidic isolation chamber.

22. The system as claimed in claim 1 wherein the fluidic control and analysis unit is configured to generate a series of flow rates $Q_P$ over time, for different samples of multiphase production fluid in the fluidic isolation chamber, and average the generated series of flow rates $Q_P$ to account for flow rate fluctuations over the series.

23. The system as claimed in claim 1 wherein:
the pressure-regulating actuator comprises an isolation valve positioned in the diverted flow segment and a diverter valve positioned in the primary flow segment;
the fluidic control and analysis unit is configured to communicate with the diverter valve and the isolation valve to divert multiphase production fluid to the fluidic isolation chamber and to isolate the multiphase production fluid in the fluidic isolation chamber for analysis by the fluidic phase detector;
the system comprises parallel fluidic phase detectors associated with each of the parallel flow segments of the fluidic piping;
the parallel flow segments collectively comprise parallel fluidic isolation chambers; and
the fluidic control and analysis unit is configured to alternate identities of the diverter valve and the isolation valve to facilitate alternating isolation of the multiphase production fluid in the parallel fluidic isolation chambers, and to alternate communication with the parallel fluidic phase detectors to generate relative occupancy indicators I for target phases of a multiphase production fluid isolated in each of the parallel fluidic isolation chambers.

24. The system as claimed in claim 1 wherein:
the pressure-regulating actuator comprises an isolation valve positioned in the diverted flow segment and a diverter valve positioned in the primary flow segment;
the fluidic control and analysis unit is configured to communicate with the diverter valve and the isolation valve to divert multiphase production fluid to the fluidic isolation chamber and to isolate the multiphase production fluid in the fluidic isolation chamber for analysis by the fluidic phase detector;
the system comprises parallel fluidic phase detectors associated with each of the parallel flow segments of the fluidic piping;
the parallel flow segments collectively comprise parallel fluidic isolation chambers, each comprising an isolation valve;
the fluidic control and analysis unit is configured to coordinate isolation of the multiphase production fluid in the parallel fluidic isolation chambers, and to communicate with the parallel fluidic phase detectors to generate relative occupancy indicators I for target phases of a multiphase production fluid isolated in each of the parallel fluidic isolation chambers.

25. The system as claimed in claim 1, wherein:
the pressure-regulating actuator is operable to regulate fluid pressure upstream of the fluidic isolation chamber by controlling the volumetric expansion of the fluidic isolation chamber and by controlling a rate at which multiphase production fluid is introduced into the fluidic isolation chamber;
the fluidic control and analysis unit is configured to maintain fluidic pressure upstream of the fluidic isolation chamber by controlling the pressure-regulating actuator to maintain the fluidic pressure upstream of the fluidic isolation chamber operationally constant as the multiphase production fluid is diverted to the fluidic isolation chamber;
the fluidic control and analysis unit is configured to generate the total flow rate $Q_{TOT}$ as a function of the chamber filling time and the volumetric expansion $\Delta V$ of the fluidic isolation chamber; and
the fluidic control and analysis unit is configured to generate the total flow rate $Q_{TOT}$ as a function of the chamber filling time and the volumetric expansion $\Delta V$ of the fluidic isolation chamber.

26. The system as claimed in claim 1, wherein:

the pressure-regulating actuator comprises (i) a sealed piston that is operable to regulate fluid pressure upstream of the fluidic isolation chamber by controlling the volumetric expansion of the fluidic isolation chamber, (ii) a flow control valve that is operable to regulate fluid pressure upstream of the fluidic isolation chamber by controlling a rate at which multiphase production fluid is introduced into the fluidic isolation chamber, or (iii) both;

the flow control valve comprises an isolation valve positioned in the diverted flow segment, a diverter valve positioned in the primary flow segment, or both;

the pressure-regulating actuator is operable to regulate fluid pressure upstream of the fluidic isolation chamber by controlling the volumetric expansion of the fluidic isolation chamber, by controlling a rate at which multiphase production fluid is introduced into the fluidic isolation chamber, or both.

27. A method for measuring phase flow rates of a multiphase production fluid in a system comprising fluidic piping, a fluidic isolation chamber, a pressure-regulating actuator, an upstream fluidic pressure sensor, a fluidic phase detector, and a fluidic control and analysis unit, in which:

the fluidic piping comprises a primary production fluid flow segment, a diverted flow segment, and a production fluid diversion point in the primary production fluid flow segment;

the diverted flow segment extends downstream from the production fluid diversion point to the fluidic isolation chamber, parallel to a portion of the primary production fluid flow segment downstream of the production fluid diversion point;

the fluidic isolation chamber expands volumetrically in response to fluid pressure when multiphase production fluid is diverted through the diverted flow segment at the production fluid diversion point;

the pressure-regulating actuator is operable to regulate fluid pressure upstream of the fluidic isolation chamber;

the upstream fluidic pressure sensor generates an upstream fluidic pressure signal that is indicative of the fluid pressure upstream of the fluidic isolation chamber; and the method comprises utilizing the fluidic control and analysis unit to:

communicate with the upstream pressure sensor and the isolation chamber actuator to maintain fluidic pressure upstream of the fluidic isolation chamber as the multiphase production fluid is diverted to the fluidic isolation chamber, generate a total flow rate $Q_{TOT}$ for the multiphase production fluid as a function of a chamber filling time t and a volumetric expansion $\Delta V$ of the fluidic isolation chamber in response to fluid pressure introduced when multiphase production fluid is diverted through the diverted flow segment at the production fluid diversion point, communicate with the fluidic phase detector to generate a relative occupancy indicator I for a target phase of a multiphase production fluid in the fluidic isolation chamber, and generate a flow rate $Q_P$ for the target phase as a function of the total flow rate $Q_{TOT}$ of the multiphase production fluid and the relative occupancy indicator I for the target phase.

* * * * *